(No Model.) 6 Sheets—Sheet 1.

H. W. MORGAN.
NAILING MACHINE.

No. 586,711. Patented July 20, 1897.

WITNESSES.

INVENTOR:

(No Model.) H. W. MORGAN. 6 Sheets—Sheet 3.
NAILING MACHINE.

No. 586,711. Patented July 20, 1897.

WITNESSES
INVENTOR (No Model.) 6 Sheets—Sheet 4.
H. W. MORGAN.
NAILING MACHINE.
No. 586,711. Patented July 20, 1897.
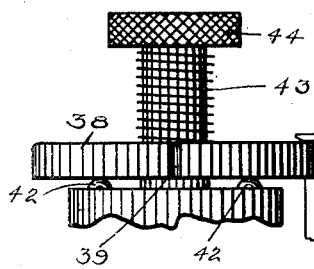
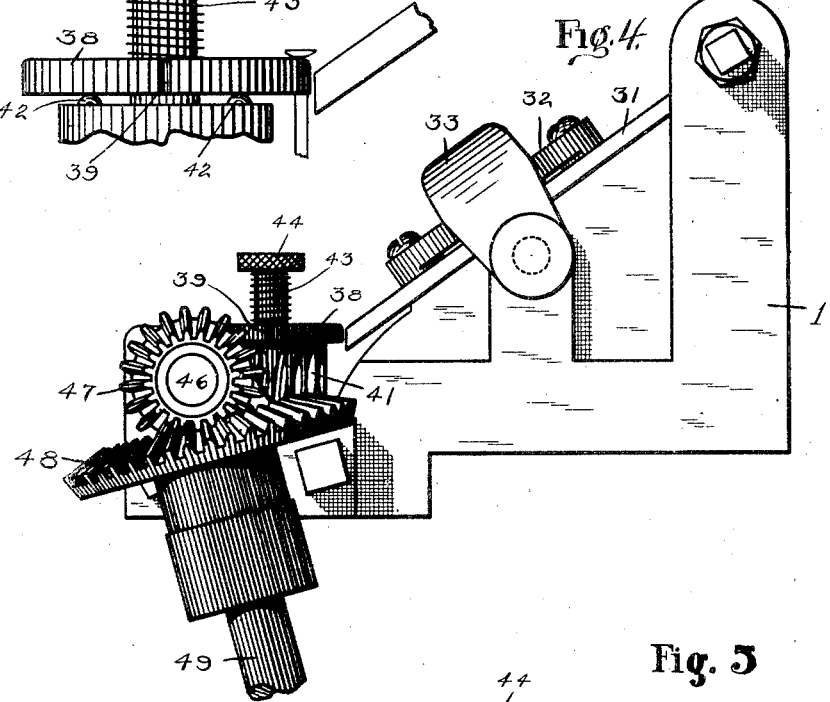
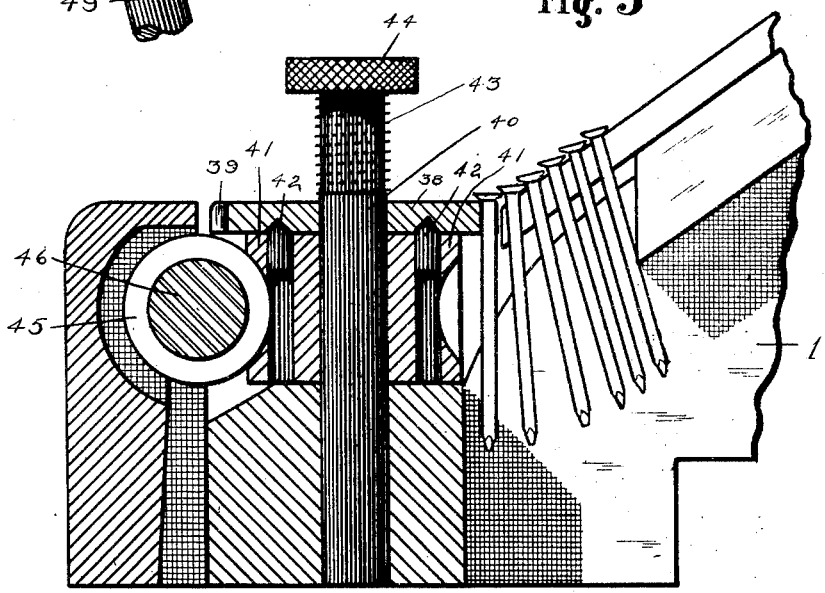
WITNESSES
Maurice W. Sutton.
G. Willard Rich.
INVENTOR
Henry W. Morgan
by Church & Church
his Attys

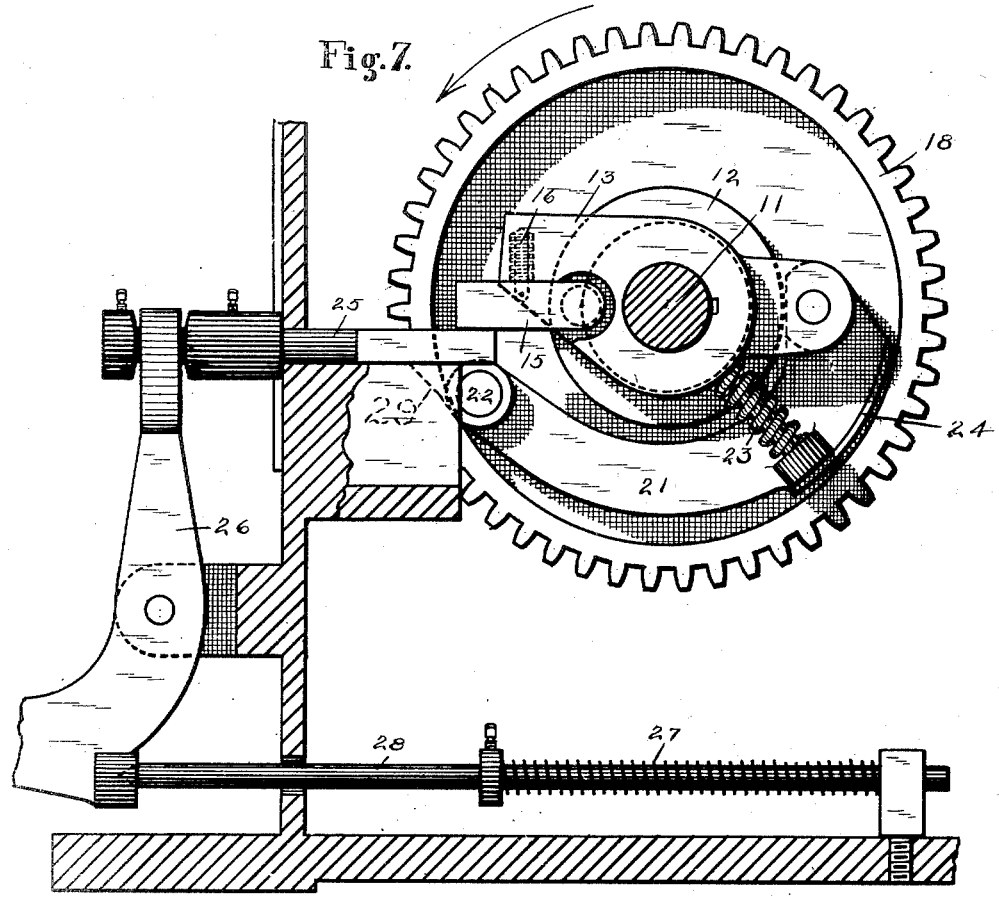
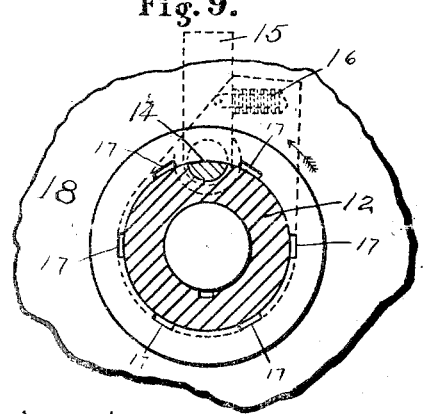
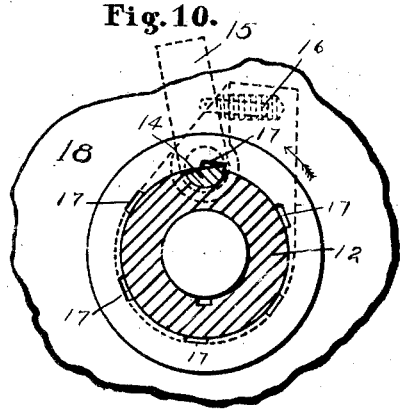

(No Model.) 6 Sheets—Sheet 6.

H. W. MORGAN
NAILING MACHINE.

No. 586,711. Patented July 20, 1897.

WITNESSES

INVENTOR

UNITED STATES PATENT OFFICE.

HENRY W. MORGAN, OF ROCHESTER, NEW YORK.

NAILING-MACHINE.

SPECIFICATION forming part of Letters Patent No. 586,711, dated July 20, 1897.

Application filed August 1, 1896. Serial No. 601,377. (No model.)

*To all whom it may concern:*

Be it known that I, HENRY W. MORGAN, of Rochester, in the county of Monroe and State of New York, have invented certain new and useful Improvements in Nailing-Machines; and I do hereby declare the following to be a full, clear, and exact description of the same, reference being had to the accompanying drawings, forming a part of this specification, and to the reference-numerals marked thereon.

My invention has for its object to improve the construction and operation of that class of machines such as illustrated in my prior patent, No. 556,430, dated March 17, 1896; and my present improvements consist in the nail-feeding devices and also in certain improvements in the clutch devices for controlling the operation of the machine, which, although particularly advantageous in a nailing-machine, can be used with good effect in other machines; and my invention further consists in certain improvements in construction and combinations of parts, all as will be hereinafter fully described and the novel features pointed out in the claims at the end of this specification.

Figure 1:
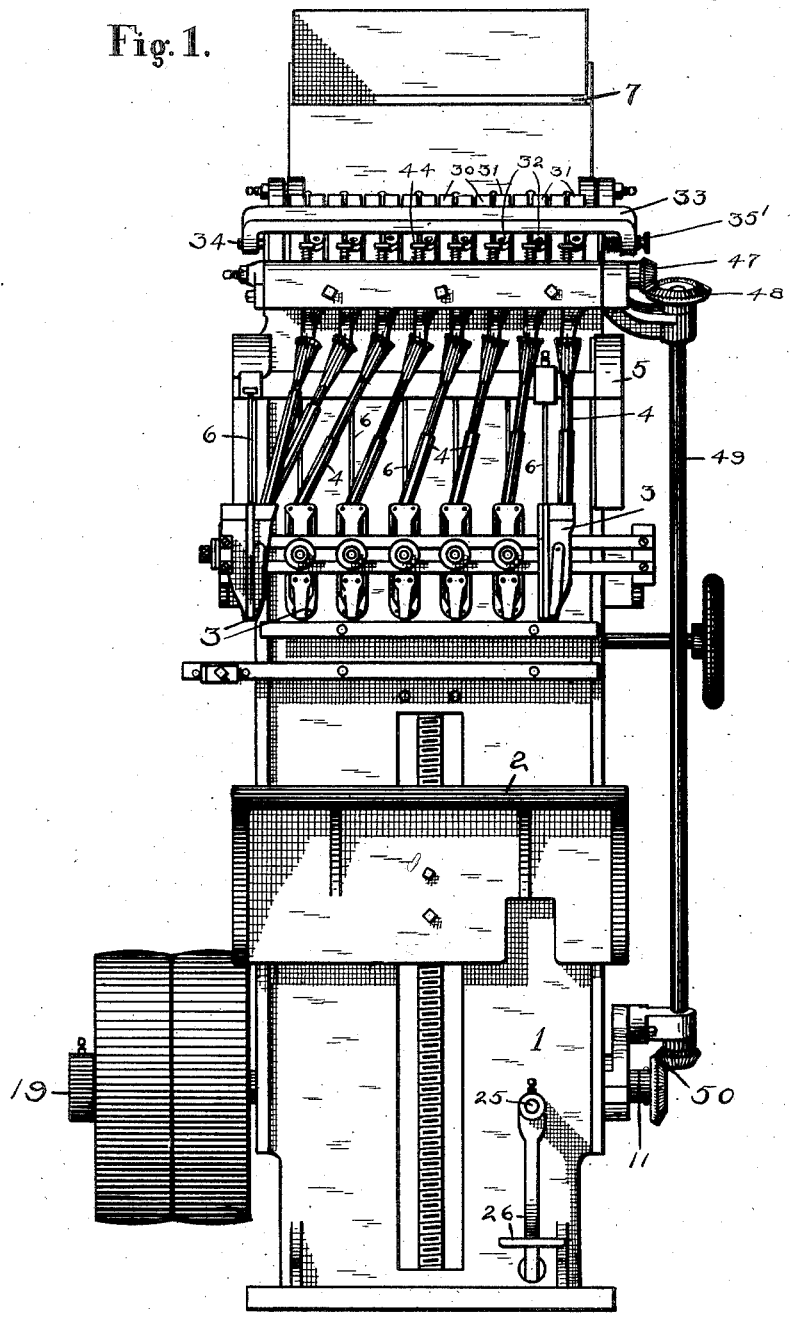
Figure 2:
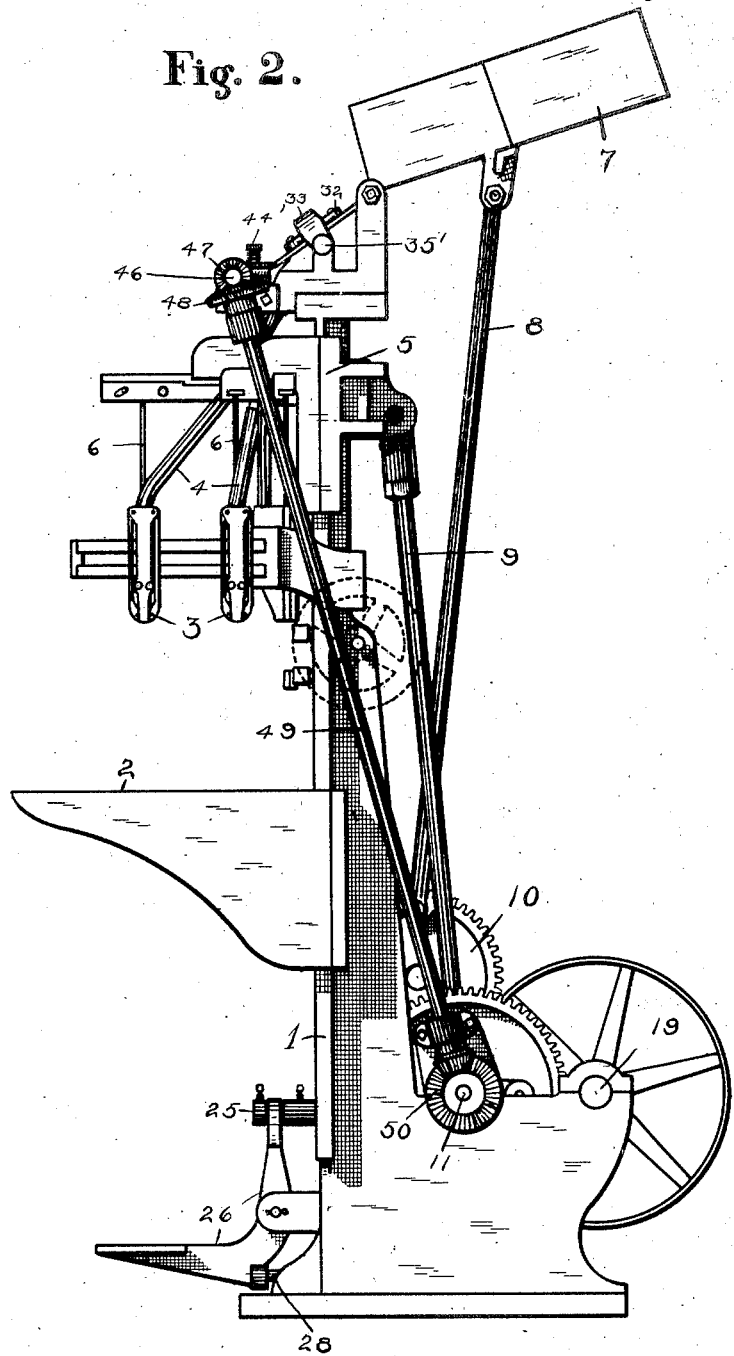
Figure 3:
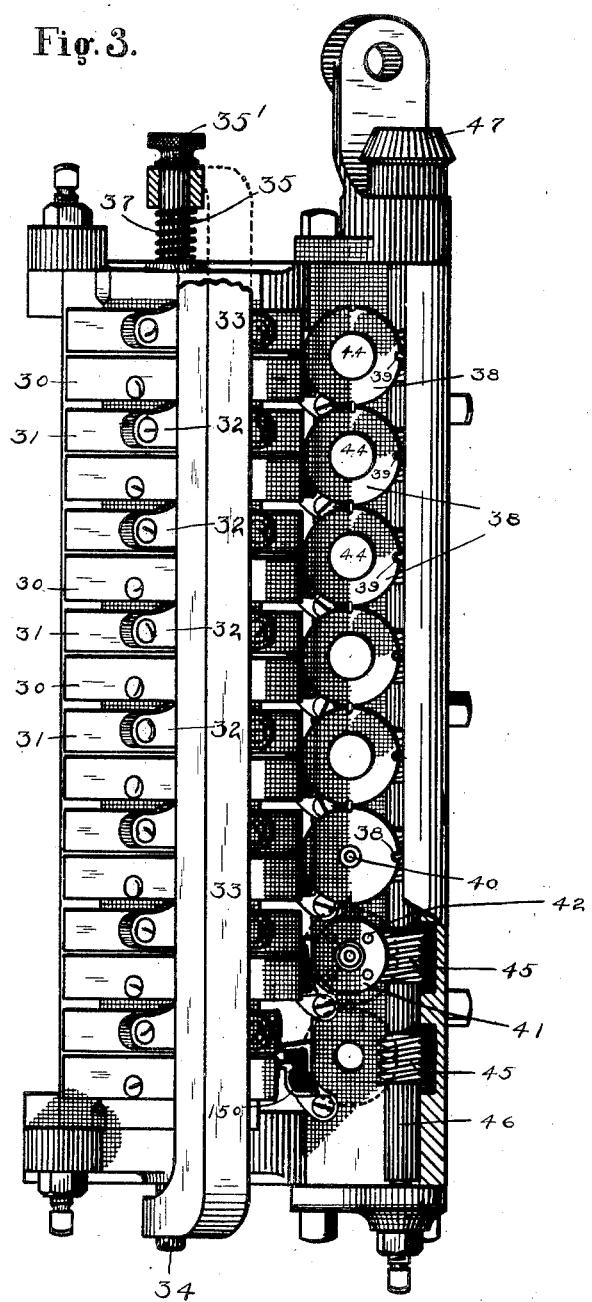
Figure 8:
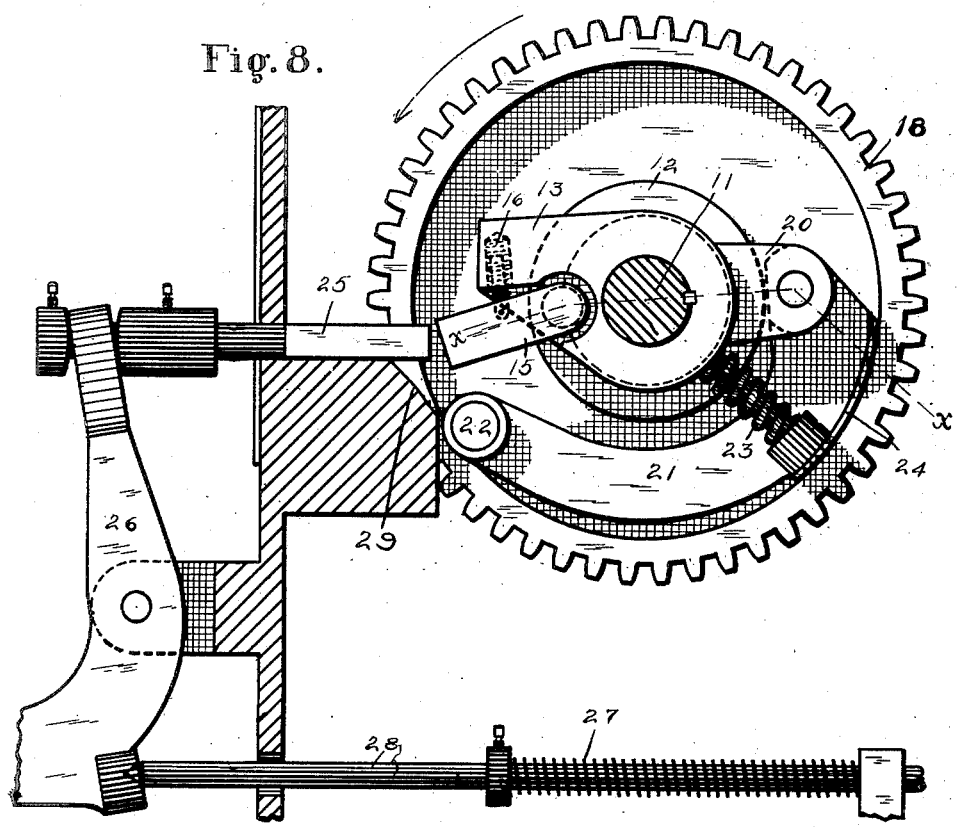
Figure 11:
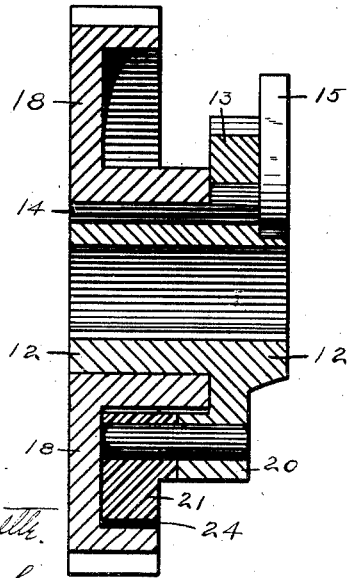

In the drawings, Figure 1 is a front elevation of a machine constructed in accordance with my invention; Fig. 2, a side view of the same; Fig. 3, a plan view of the nail-feeding devices; Fig. 4, an end view of the upper portion of the machine; Fig. 5, a sectional view of the feeding devices; Fig. 6, a detail view; Fig. 7, a sectional view showing the clutch and its operating means with the clutch disengaged; Fig. 8, a similar view showing the clutch engaged and the shaft which it controls operating; Figs. 9 and 10, sectional views showing the operation of the clutch; Fig. 11, a sectional view of the operating-wheel and the sleeve carrying the clutch, taken on the line *x x* of Fig. 8.

Similar reference-numerals in the several figures indicate similar parts.

1 indicates the main frame of the machine; 2, the box-support or table; 3, the nail-chucks; 4, the conduits leading thereto; 5, the reciprocating frame carrying the drivers 6 and operated by a pitman 9; 7, the nail pan or receptacle; 8, the pitman for tilting it, connected to a wrist-pin on a wheel 10 or otherwise suitably operated. These parts may be constructed as shown in my prior patent or otherwise, and their particular construction forms no part of my present invention.

The pitman 9, operating the driver-frame, is connected to a suitable crank formed upon or attached to a shaft 11, journaled in suitable bearings in the main frame and to which is keyed a sleeve 12, having upon one end an arm 13, and in the outer surface of the sleeve is arranged a semicircular recess, in which fits a correspondingly-shaped clutch key or pin 14, adapted when in the position in full lines in Fig. 9 to present a curved surface coinciding with the periphery of the sleeve. The key 14 is provided at one end with an arm 15, and between said arm and arm 13 is arranged a spring 16, as shown in dotted lines in Figs. 7 to 10, the tendency of which is to turn the key 14 to the position shown in full lines in Fig. 10, causing the edge of said key to engage with one of a series of notches 17, formed in the interior of a gear 18, which is journaled loosely upon the sleeve, as shown in Fig. 11. The gear-wheel 18 is driven constantly by suitable intermediate gearing between it and a suitably-operating shaft 19, which constitutes the prime mover of the machine. The sleeve 12 is further provided with an extension 20, to which is pivoted one end of a friction-clutch or brake-lever 21, the other end having a stud or roller 22, and between said lever and the sleeve is arranged a spring 23, operating to force the outer side of the lever into contact with the overhanging edge of the wheel 18, so that the friction-clutch will operate to hold the wheel and sleeve together by friction. A suitable shoe or surface 24 may be arranged on the outer side of the lever, if desired. The tripping device for the positive clutch consists, in the present embodiment, of a horizontally-movable rod or latch 25, operating in the main frame and actuated in one direction by a treadle or lever 26 and in the other by a spring 27, operating on a thrust-rod 28, and the frame is provided with a shoulder 29, with which the projection or roller 22 on the end of the lever 21 is adapted to coöperate when the arm 15 of the clutch is engaged by the rod or pin 25, as shown particularly in Fig. 7, this projection 29 then operating to hold the friction-clutch lever 21 out of engagement with the gear 18. It being understood that the gear-wheel 18 is driven continuously in the direction indicated by the arrow and the latch-bolt 25 being in the position shown in Fig. 7, the clutch-key 14 is held out of engagement with the slots in the gear, and the lever 21 is out of contact with the wheel, the nailing-machine proper being then stationary with the frame carrying the drivers in elevated position.

When it is desired to operate the machine, the operator presses upon the foot-lever 26, withdrawing the latch-bolt 25 and permitting the spring 16 to throw the key 14 to the position shown in Fig. 10, whereupon the recess or slot 17 next approaching the key will engage the latter and carry the shaft around, operating the driving and feeding mechanism of the nailing-machine in the usual manner. As soon as the shaft moves sufficiently to cause the projection 22 on the lever 21 to leave the projection 29 on the frame the spring 23 throws the friction-clutch into engagement with the wheel 18, preventing the independent movement of the driving-shaft and the wheel and causing them to rotate together, and if desired that the shaft should make only a single revolution the treadle 26 is immediately released, and the bolt 25 moving inward will engage the arm 15 and disengage the rotary key 14 from the shaft, as shown in Fig. 7, the projection 22 on the lever 21 then engaging the projection 29 and releasing the brake from the wheel, but of course a number of revolutions can be made by continuing the pressure on the treadle.

While this construction of clutch mechanism is applicable to various machines, it is particularly adapted for a machine of this description, inasmuch as the vertically-moving frame carrying the drivers is to be arrested when elevated and the crank on the shaft 11 is above the center, because when the crank is thrown off the center and moving toward the front the weight of the driver-frame is apt to cause a racing of the shaft faster than the wheel operating it and an irregular operation of the machine; but it will be seen from the above that as soon as the shaft begins to move and the end of the clutch-lever leaves the projection 29 the friction-clutch locks the wheel 18 and said shaft together and prevents their independent movement until at the proper time the positive clutch is disengaged by the bolt 25, at which time the friction-clutch is thrown off by the engagement of the projections 22 and 29. It is not absolutely essential that a positive clutch embodying the rotary pin 14 be employed in connection with a friction-clutch of this description, as any other suitable form of clutch could be used, but I prefer this for obvious reasons, though I do not wish to be confined to it. Nor is it necessary that the positive-clutch members—i. e., the wheel and shaft—be arranged as shown, as the specific form of these parts is not of the essence of the invention and they could be variously modified, as could also the form of the friction-clutch.

The nail-receptacle 7 for containing the nails to be fed to the drivers is of the usual or any preferred construction provided with slots or channels in its bottom, from which the nails are delivered into the receiving-channels on the upper part of the main frame, said channels being formed, in the present instance by stationary plates 30 and movable plates 31, the former secured rigidly to the frame in any suitable manner and the latter connected by brackets 32 with a bar 33, movable longitudinally to adjust the width of the channels and in the present construction having its end bent down and one end guided by a stud or screw 34 and the other by a stud 35, having an adjustable nut 35' thereon, a spring 37 being interposed between the inner side of said end and the main frame, the movement of the bar and plates 31 in one direction being caused by the spring and in the other by the nut 35', and by this means the widths of the channels can be readily adjusted so as to adapt the machine to operate with different-sized nails, the movement of the single nut being sufficient. Of course a bolt could be used instead of the nut, if desired.

The plates 30 and 31 are of course inclined, so that the nails will slide down, then hanging by their heads, as in Fig. 5, and the feeding or delivering devices embody the rotary selector-disks 38, having slots 39 in their peripheries and mounted upon studs 40, secured to the main frame. 41 indicates worm-gears loosely journaled on the studs 40 and having on their upper sides one or more pins 42, adapted to enter corresponding apertures formed in the under side of the disks 38, the ends of said projections being preferably beveled and the disks 39 held down upon them by means of springs 43, encircling the studs and arranged beneath adjustable nuts or collars 44. This forms a frictional connection between the wheels and disks, and the pins could be dispensed with, if desired, and the friction between the wheels and disks alone relied upon, but the employment of the pins enables the disks to be readily set so as to cause their correct relative operation. The worm-gears 41 are actuated by worms 45 on a shaft 46, journaled in the frame of the machine, said shaft being provided at its end with a beveled pinion 47, meshing with a corresponding pinion 48 on a shaft 49, driven by beveled gearing 50 from the shaft 11. (Shown particularly in Figs. 1 and 2.) The gearing between the shaft 11 and the worm-shaft 46 is such that at each revolution of the shaft 11 the selectors will all be rotated a quarter-revolution, carrying the lowermost nails from the ends of the nail slots or raceways around and the sides of the apertures 150 removing them from the disks and depositing them in the nail-channels leading to the chucks, as usual.

The connection between the selector-disks 38 and their driving-wheels 41 is such that while under normal conditions the nails will be carried around and deposited in the chutes or channels leading to the chucks, if a nail should be caught, say, between the edge of the disk and one of the plates 30 or 31, so that the operation of any selector-disk is prevented, the springs 43 will yield and permit the arrested disk to rise vertically on the inclined projections, as in Fig. 6, and become disengaged from the projections on its operating worm-wheel, this frictional engagement with the parts preventing breakage and allowing the other selectors to perform their functions notwithstanding one or more of them may be arrested by a defective nail. It will also be understood that any of the selector-disks can be adjusted or removed and other disks having differently-spaced slots or recesses at the edge be substituted, if it is desired to feed nails at different times or different kinds of nails.

I claim as my invention—

1. In a nailing-machine, the combination with the nail-feeding devices, of the stationary plates 30, the movable plates 31, the bar 33 connecting the plates 31 having the downwardly-extending perforated ends, the guide-pin 34 at one end of the bar, the bolt 35 at the other end, the spring 37 operating to move the bar to separate the channel-plates, and the nut 35' engaging the bar opposite the spring, substantially as described.

2. In a nailing-machine, the combination with the driver-frame, the pitman actuating it, and the shaft to which the pitman is connected, of the driving-wheel, a positive clutch operating one way only and arranged between the wheel and shaft, and an automatic friction-clutch also between the wheel and shaft, substantially as described.

3. In a nailing-machine, the combination with a vertically-movable frame, a wheel and a shaft to one of which the frame is connected, of a positive clutch operating one way only and arranged between said wheel and shaft, and an automatic friction clutch or brake connecting said parts when rotating, substantially as described.

4. In a nailing-machine, the combination with the shaft, the pitman connected thereto, and the driver-head, of the rotary driving-wheel, having the recesses, the sleeve on the shaft, the rotary pin having the arm, the spring for operating it, the movable bolt cooperating with the arm, the friction-clutch between the sleeve and wheel, and the stationary projection for releasing it, substantially as described.

5. The combination with the driving member and the intermittingly-operating driven member, as the wheel and shaft, respectively, of a positive driving-clutch arranged between said members and connecting them for rotation in one direction only, means for controlling said clutch, and an automatic friction-clutch for connecting said members only after the positive clutch has become engaged, substantially as described.

6. The combination with the rotary driver and driven members, as the driving-wheel, and the shaft, of a positive driving-clutch between said members connecting them only when the driver moves faster than the driven member, an automatic friction clutch or brake between the members, means operating to connect them only after the positive clutch has become engaged and means for disconnecting the friction-clutch when one of the members is arrested, substantially as described.

7. The combination with the rotary driver and driven members, as a driving-wheel and the shaft, of a positive driving-clutch between said members connecting them only when the driver member moves the more rapidly, an automatic friction-clutch between the members, means operating to connect them only after the positive clutch has become engaged, a relatively stationary projection for disconnecting the friction-clutch, and means for operating the driving-clutch, substantially as described.

8. The combination with the wheel, the shaft, the rotary clutch-pin between the wheel and shaft operating one way only, and means for operating it, the friction-clutch between the wheel and shaft, the projection for cooperating with it, and the bolt cooperating with the clutch-pin, substantially as described.

9. The combination with the shaft, the wheel thereon and positive clutch devices between them operating one way only, of the pivoted clutch-arm on the shaft cooperating with the wheel, the spring actuating the clutch-arm to engage the wheel and a relatively stationary projection in the path of the movement of the clutch-arm and adapted to engage the latter and hold it out of engagement against the tension of the spring at one point in its rotation.

10. The combination with the shaft, the sleeve thereon, the rotary clutch-pin having the extended arm, the spring for operating the pin, the friction clutch-arm pivoted on the sleeve, having the projecting end, and the spring for actuating it, of the wheel mounted on the sleeve having the interior recesses, and the overhanging edge, the bolt cooperating with the clutch-pin and the projection cooperating with the friction clutch-arm, substantially as described.

11. In a feeding device for nailing-machines, the combination of a rotary driving-wheel, a rotary selector-disk thereon having the notched periphery, and the spring for holding said disk and wheel in frictional connection when feeding nails, but permitting the arrest of the disk without interfering with the driving-wheel, substantially as described.

12. In a feeding device for nailing-machines, the combination of a rotary driving-wheel, the rotary selector-disk thereon, the beveled projections and recesses between the wheel and disk, and the spring for holding said wheel and disk together, substantially as described.

13. In a nailing-machine, the combination with the worm-shaft and a worm thereon, of the worm-wheel, the selector-disk thereon having notches in its periphery, and the springs for holding the worm-wheels and disks in frictional engagement, substantially as described.

14. In a nailing-machine, the combination with a series of positively-driven wheels, of a series of selector-disks, one on each wheel and having nail-notches in their peripheries, and springs for holding the disks and wheels in frictional engagement, substantially as described.

15. In a nailing-machine, the combination with a series of positively-driven wheels, of a series of selector-disks, one on each wheel, and having nail-notches in their peripheries, the beveled projections and recesses between said wheels and disks, and springs for pressing said wheels and disks together with the projections and recesses in engagement, substantially as described.

HENRY W. MORGAN.

Witnesses:
F. F. CHURCH,
G. A. RODA.